United States Patent [19]
Chatterji et al.

[11] Patent Number: 5,897,699
[45] Date of Patent: Apr. 27, 1999

[54] FOAMED WELL CEMENT COMPOSITIONS, ADDITIVES AND METHODS

[75] Inventors: Jiten Chatterji; David D. Onan, both of Duncan; Roger S. Cromwell, Walters; Bobby J. King, Duncan, all of Okla.

[73] Assignee: Halliburton Energy Services, Inc., Duncan, Okla.

[21] Appl. No.: 08/899,043

[22] Filed: Jul. 23, 1997

[51] Int. Cl.$^6$ ............................ C04B 24/12; C04B 24/16; E21B 33/138
[52] U.S. Cl. .................... 106/678; 106/682; 106/725; 106/727; 106/808; 106/809; 106/823; 106/820; 106/287.25; 106/287.32; 166/293; 166/294; 166/309; 405/267
[58] Field of Search ..................... 106/677, 678, 106/682, 724, 725, 727, 808, 809, 823, 820, 287.24, 287.25, 287.32; 166/293, 294, 309; 507/203, 269; 405/267

[56] References Cited

U.S. PATENT DOCUMENTS

| | | | |
|---|---|---|---|
| 3,926,650 | 12/1975 | Lange et al. | 106/678 |
| 5,133,409 | 7/1992 | Bour et al. | 166/293 |
| 5,147,565 | 9/1992 | Bour et al. | 252/8.551 |
| 5,569,324 | 10/1996 | Totten et al. | 106/823 |
| 5,580,378 | 12/1996 | Shulman | 106/823 |
| 5,588,489 | 12/1996 | Chatterji | 166/293 |
| 5,696,059 | 12/1997 | Onan et al. | 166/293 |
| 5,711,801 | 1/1998 | Chatterji et al. | 106/823 |

*Primary Examiner*—Michael Marcheschi
*Attorney, Agent, or Firm*—Craig W. Roddy; C. Clark Dougherty, Jr.

[57] ABSTRACT

The present invention relates to improved foamed well cement compositions, additives and methods. The additives, which foam and stabilize a cement slurry containing freshwater or saltwater, are basically comprised of an aqueous solution of an alpha-olefinic sulfonate surfactant and a betaine surfactant.

22 Claims, No Drawings

FOAMED WELL CEMENT COMPOSITIONS, ADDITIVES AND METHODS

BACKGROUND OF THE INVENTION

1. Field of the Invention

The present invention relates to foamed well cement compositions, additives for foaming and stabilizing the compositions and methods of using the compositions.

2. Description of the Prior Art

Hydraulic cement compositions are commonly utilized in subterranean well completion and remedial operations. For example, hydraulic cement compositions are used in primary cementing operations whereby strings of pipe such as casings and liners are cemented in well bores. In performing primary cementing, a hydraulic cement composition is pumped into the annular space between the walls of a well bore and the exterior surfaces of a pipe string, e.g., casing, disposed therein. The cement composition is permitted to set in the annular space thereby forming an annular sheath of hardened substantially impermeable cement therein. The cement sheath physically supports and positions the pipe in the well bore and bonds the exterior surfaces of the pipe to the walls of the well bore whereby the undesirable migration of fluids between zones or formations penetrated by the well bore is prevented.

In carrying out primary cementing as well as remedial cementing operations in well bores, the cement compositions utilized must often be light weight to prevent excessive hydrostatic pressure from being exerted on formations penetrated by the well bore. Consequently, foamed cement compositions have often been utilized heretofore.

The typical non-foamed cement compositions utilized must have adequate pumping times before placement and relatively short set times after placement. If such a cement composition is slow to set, pressurized formation fluids can flow into and through the cement composition before and after it sets. Such an occurrence is attributable to the inability of the cement composition to transmit hydrostatic pressure during the transition time of the cement composition, i.e., the time during which the cement composition changes from a true fluid to a hard set mass. During the transition time, the initial hydration of the cement composition has begun and the composition starts to develop static gel strength. While the cement composition has little or no compressive strength, it becomes partially self-supporting which lowers the hydrostatic pressure exerted by the composition on pressurized fluid containing formations penetrated by the well bore. When the cement composition becomes partially self-supporting, volume reductions in the cement composition caused by hydration and fluid loss result in rapid decreases in the hydrostatic pressure exerted by the cement composition. This, in turn, allows pressurized formation fluids to enter the well bore and flow through the cement composition forming undesirable flow passages therein which remain after the cement composition sets. Thus, a further advantage of utilizing a foamed cement composition is that the gas in the composition is compressible. As a result of being compressed, the gas improves the ability of the composition to maintain pressure and prevent the flow of formation fluids into and through the cement composition during the transition time. Foamed cement compositions are also advantageous because they have low fluid loss properties.

While the heretofore used foamed cement compositions have included various surfactants known as foaming agents for facilitating the foaming of a cement slurry when a gas is mixed therewith and various other surfactants known as foam stabilizers for preventing the foamed cement slurries from prematurely separating into their slurry and gas components, various problems in the use of such surfactants have been experienced. For example, the particular foam stabilizer which must be used depends upon the particular temperature to which a foamed cement composition will be subjected. Further, the foaming agent used depends upon the particular components in the cement slurry. Also, the quantities of the foaming agent and foam stabilizer will vary depending upon the particular types of foaming agent and foam stabilizer used. In addition, upon mixing the foaming agent and the foam stabilizer with water, gelation sometimes occurs. Finally, the presence of the heretofore used foaming agents and foam stabilizers often lowers the compressive strengths of foamed cement compositions after they set.

Thus, there are needs for improved foamed well cement compositions, additives for foaming and stabilizing the compositions and methods of using the compositions which obviate the above described problems.

SUMMARY OF THE INVENTION

The present invention provides improved foamed well cement compositions, improved universal additives for foaming and stabilizing the cement compositions and methods of using the cement compositions. The improved foamed cement compositions are basically comprised of a hydraulic cement, sufficient water to form a pumpable slurry, sufficient gas to form a foam and an effective amount of a single additive for foaming and stabilizing the slurry comprised of about 2 parts by weight of an alpha-olefinic sulfonate surfactant having the formula

wherein n and m are individually integers in the range of from about 6 to 16, and about 1 part by weight of a betaine surfactant having the formula

wherein R is a radical selected from the group of decyl, cetyl, oleyl, lauryl and cocoyl.

The improved additive of this invention for foaming and stabilizing a cement slurry is a single universal additive which can be utilized with cement slurries containing freshwater or saltwater as well as a variety of other components. The additive basically comprises about 2 parts by weight of the above described alpha-olefinic sulfonate surfactant and 1 part by weight of the above described betaine surfactant. Preferably, the additive is an aqueous solution of the above described surfactants which can be readily mixed with a cement slurry. The additive can also contain freezing point depressants to prevent it from freezing and depress the pour point of the additive.

The methods of the present invention comprise the steps of forming a foamed cement composition of the present invention comprised of hydraulic cement, sufficient water to form a pumpable slurry, sufficient gas to form a foam and an affective amount of the above described additive for foaming and stabilizing the cement slurry, pumping the foamed cement composition into a subterranean zone by way of a well bore penetrating the zone and then allowing the foamed cement composition to set into a hard impermeable mass therein.

It is, therefore, a general object of the present invention to provide improved foamed well cement compositions, additives and methods.

Other and further objects, features and advantages of the present invention will be readily apparent to those skilled in the art upon a reading of the description of preferred embodiments which follows.

DESCRIPTION OF PREFERRED EMBODIMENTS

As mentioned, the foamed cement compositions of this invention are useful in performing a variety of completion and remedial procedures in subterranean formations or zones penetrated by well bores. While freshwater can be and often is used for forming the foamed cement compositions, when the formation or zone to be treated contains salt, or when it is advantageous to use saltwater as a result of its availability, saltwater is used to form the foamed cement compositions. When the saltwater contains salt in an amount above about 18% by weight up to the saturation amount, it has heretofore been necessary to utilize a particular foaming agent and a particular foam stabilizer in order to produce a foamed cement composition having a relatively short set time. For example, U.S. Pat. No. 5,147,565 issued to Bour, et al. on Sep. 15, 1992 discloses foamed hydraulic cement compositions containing saltwater, a foaming agent consisting of a surfactant of the formula $R-(OR')_n-OSO_3-X^+$ and a separate foam stabilizer such as a glycol of the formula $CH_3O-(CH_2CH_2O)_nH$ or a betaine surfactant. While the foamed cement compositions described in the patent are suitable for carrying out operations in salt containing subterranean formations and are relatively quick setting, the presence of the above described foaming agent and foam stabilizer in the foamed cement compositions lowers the compressive strengths of the compositions after they set and can produce one or more of the other problems described above.

By the present invention, an improved single universal additive for foaming and stabilizing a cement slurry containing freshwater or saltwater is provided. The foamed cement compositions of this invention formed with the additive do not experience the above described problems and have high compressive strengths after setting. Methods of using the improved cement compositions are also provided.

The improved foamed cement compositions of this invention are basically comprised of a hydraulic cement, sufficient water to form a pumpable slurry, sufficient gas to form a foam and an effective amount the improved additive of this invention for foaming and stabilizing the slurry comprised of about 2 parts by weight of an alpha-olefinic sulfonate surfactant having the formula

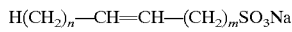

$$H(CH_2)_n-CH=CH-(CH_2)_mSO_3Na$$

wherein n and m are individually integers in the range of from about 6 to 16, and about 1 part by weight of a betaine surfactant having the formula

$$R-CONHCH_2CH_2CH_2N^+(CH3)_2CH_2CO_2^-$$

wherein R is a radical selected from the group of decyl, cetyl, oleyl, lauryl and cocoyl.

A variety of hydraulic cements can be utilized in accordance with the present invention including those comprised of calcium, aluminum, silicon, oxygen and/or sulphur which set and harden by reaction with water. Such hydraulic cements include Portland cements, pozzolana cements, gypsum cements, high aluminum content cements, silica cements and high alkalinity cements. Portland cements are generally preferred for use in accordance with the present invention. Portland cements of the types defined and described in *API Specification for Materials and Testing for Well Cement, API Specification* 10, 5th ed., dated Jul. 1, 1990 of the American Petroleum Institute are particularly suitable. Preferred such API Portland cements include classes A, B, C, G and H, with API classes G and H being more preferred and class G being the most preferred.

As mentioned, the water in the cement compositions can be freshwater or saltwater. The term "saltwater" is used herein to mean unsaturated salt solutions and saturated salt solutions including brines and seawater. The water is generally present in the cement compositions in an amount in the range from about 35% to about 65% by weight of cement in the compositions.

The gas for foaming the compositions can be air or nitrogen, with nitrogen being preferred. The gas is present in an amount sufficient to foam the cement compositions, generally in an amount in the range from about 10% to about 70% by volume of the compositions.

The additive of this invention comprised of about two parts by weight alpha-olefinic sulfonate and one part by weight betaine for foaming and stabilizing the cement compositions is included in the cement compositions in an amount in the range from about 2% to about 3% by volume of the water in the compositions.

As mentioned above, the improved additive of this invention is a single universal additive which can be utilized in cement compositions containing freshwater or saltwater. The additive basically comprises about 2 parts by weight of the above described alpha-olefinic sulfonate surfactant and 1 part by weight of the above described betaine surfactant. Preferably, the additive is an aqueous solution of the surfactants whereby it can be readily mixed with the cement slurry to be foamed. That is, the alpha-olefinic sulfonate surfactant is included in an aqueous solution in an amount in the range from about 15% to about 25% by weight of the solution and the betaine surfactant is included in the solution in an amount in the range from about 8% to about 12% by weight of the solution. The alpha-olefinic sulfonate surfactant is preferably a mixture of the alpha-olefinic sulfonates described above which is commercially available from the Whitco Chemical Co. of Houston, Texas under the trade designation "C-5639™." The mixture is preferably present in the aqueous solution in an amount of about 19.3% by weight of the solution. The betaine surfactant is preferably cocoylamidopropylbetaine present in the solution in an amount of about 10% by weight of the solution.

As also mentioned above, the additive can include one or more freezing and pour point depressants to prevent it from freezing during storage or handling in cold weather and lower it's pour point. Preferably, such depressants are selected from the group of ethylene glycol monobutyl ether, diethylene glycol, sodium chloride and mixtures thereof. The depressant or depressants utilized are generally present in the additive solution in a range from about 15% to about 25% by weight of the solution.

The foamed cement compositions of this invention may be prepared in accordance with any of the mixing techniques utilized in the art. In one preferred method, a quantity of water is introduced into a cement blender followed by the hydraulic cement utilized. The mixture is agitated for a sufficient period of time to form a pumpable non-foamed slurry. The slurry is then pumped to the well bore, and the additive of this invention for foaming and stabilizing the slurry followed by the gas utilized are injected into the slurry on the fly. As the slurry and gas flow through the well bore to the location where the resulting foamed cement composition is to be placed, the cement composition is foamed and stabilized. Other liquid additives utilized, if any, are added to the water prior to when the hydraulic cement is mixed therewith and other dry solids, if any, are added to the water and cement prior to mixing.

The methods of this invention of cementing a subterranean zone penetrated by a well bore basically comprise the steps of forming a foamed cement composition of this invention, pumping the foamed cement composition into the subterranean zone to be cemented by way of the well bore and then allowing the foamed cement composition to set into a hard impermeable mass therein.

In order to further illustrate the improved cement compositions, additives and methods of this invention, the following example is given.

wherein R is a cocoyl group. This foam stabilizer is commercially available from Halliburton Energy Services of Duncan, Oklahoma under the trade designation "HC-2™." After the addition of the additive of this invention or the separate prior art foaming agent and foam stabilizer to the test samples in the jars, the contents were mixed at high speed. The high speed mixing by the stacked blade assembly caused each slurry to be foamed with air. Descriptions of the various test samples are set forth in Table I below.

TABLE 1

TEST FOAMED CEMENT COMPOSITIONS

| Sample No. | Hydraulic Cement | Fresh water, gal per 94 lb sack of cement | Sodium Chloride dissolved in the water, % by water | Density of cement slurry prior to foaming, lb/gal | Foaming and stabilizing additive of Invention[2], % by volume of water | Prior Art Foaming agent, % by volume of water | Prior Art foam stabilizer, % by volume of water | Foamed Cement Composition Density, lb/gal |
|---|---|---|---|---|---|---|---|---|
| 1 | Portland Class G | 5.09 | — | 15.8 | 2.5 | — | — | 11.2 |
| 2 | Portland Class G | 5.09 | 5 | 15.9 | 2.5 | — | — | 11.0 |
| 3 | Portland Class G | 5.09 | 10 | 16.0 | 2.5 | — | — | 11.0 |
| 4 | Portland Class G | 5.09 | 18 | 16.15 | 2.5 | — | — | 11.5 |
| 5 | Portland Class G | 5.09 | Saturated[1] | 16.48 | 2.5 | — | — | 11.2 |
| 6 | Portland Class G | 5.09 | — | 15.8 | — | 3 | 0.75 | 11.2 |
| 7 | Portland Class G | 5.09 | 5 | 15.9 | — | 3 | 0.75 | 11.0 |
| 8 | Portland Class G | 5.09 | 10 | 16.0 | — | 3 | 0.75 | 11.0 |
| 9 | Portland Class G | 5.09 | 18 | 16.15 | — | 3 | 0.75 | 11.0 |
| 10 | Portland Class G | 5.09 | Saturated[1] | 16.48 | — | 3 | 0.75 | 11.5 |

[1]The amount of salt required to form a saturated NaCl solution.
[2]Aqueous solution containing about 20% of a mixture of alpha-olefinic sulfonates (Whitco, "C-5639™"), 10% cocoylamidopropylbetaine and about 20% freezing and pour point depressants, all by weight of solution.

EXAMPLE

Test samples of foamed cement compositions comprised of hydraulic cement, fresh water or saltwater and air were prepared. For each test sample, an unfoamed cement slurry was first prepared utilizing a mixing device. Predetermined amounts of the resulting slurry were then placed in fixed volume blender jars adapted for receiving a stacked blade assembly. The additive of this invention for stabilizing and foaming a cement composition was added to some of the test samples and separate prior art foaming agent and foam stabilizer were added to other of the samples. The prior art foaming agent and foam stabilizer utilized were of the types described in U.S. Pat. No. 5,147,565 issued to Bour, et al. on Sep. 15, 1992. That is, the prior art foaming agent utilized was a surfactant having the formula

$H(CH_2)_a(OC_2H_4)_3OSO_3Na$ wherein small a is an integer in the range of from about 6 to about 10. Such a surfactant is commercially available from Halliburton Energy Services of Duncan, Oklahoma under the trade designation "CFA-S™." The separate prior art foam stabilizer utilized was an amidopropylbetaine having the formula

$R—CONHCH_2CH_2CH_2N^+—(CH_3)_2CH_2CO_2^-$

The foamed test samples were allowed to set for 24 hours at 140° F. and atmospheric pressure after which they were subjected to compressive strength tests conducted in accordance with the procedure set forth in the *API Specification 10* mentioned above. The results of the tests are set forth in Table II below.

TABLE II

COMPRESSURE STRENGTH TESTS

| Sample No. | Compressive Strength, psi |
|---|---|
| 1 | 505 |
| 2 | 710 |
| 3 | 725 |
| 4 | 780 |
| 5 | 460 |
| 6 | 450 |
| 7 | 615 |
| 8 | 654 |
| 9 | 535 |
| 10 | 345 |

From Table II it can be seen that the foamed cement compositions containing the single foaming and stabilizing additive of this invention had significantly higher compressive strengths than the foamed compositions containing separate prior art foaming agent and foam stabilizer. Also, it can be seen that the additive of this invention is effective in both fresh water and saltwater cement compositions.

Thus, the present invention is well adapted to carry out the objects and the advantages mentioned as well as those which are inherent therein. While numerous changes may be made by those skilled in the art, such changes are encompassed within the spirit of this invention as defined by the appended claims.

What is claimed is:

1. A foamed cement composition for cementing a well comprising;

a hydraulic cement;

sufficient water to form a pumpable slurry;

sufficient gas to form a foam; and an effective amount of an additive for foaming and stabilizing said slurry consisting essentially of about two parts by weight of an alpha-olefinic sulfonate surfactant having the formula $$H(CH_2)_n\text{—}CH\text{=}CH\text{—}(CH_2)_m SO_3Na$$

wherein n and m are integers in the range of from about 6 to about 16, and about 1 part by weight of a betaine surfactant having the formula $$R\text{—}CONHCH_2CH_2CH_2N^+(CH_3)_2CH_2CO_2^-$$

wherein R is a radical selected from the group of decyl, cetyl, oleyl, lauryl and cocoyl.

2. The composition of claim 1 wherein said hydraulic cement is Portland cement.

3. The composition of claim 1 wherein said water is selected from the group of fresh water, unsaturated salt solutions and saturated salt solutions.

4. The composition of claim 1 wherein said water is present in an amount in the range of from about 35% to about 65% by weight of hydraulic cement in said composition.

5. The composition of claim 1 wherein said gas is selected from the group consisting of air and nitrogen.

6. The composition of claim 1 wherein said gas is present in an amount in the range of from about 10% to about 70% by volume of said composition.

7. The composition of claim 1 wherein said alpha-olefinic sulfonate surfactant in said additive is a mixture of said alpha-olefinic sulfonates having said formula.

8. The composition of claim 1 wherein said betaine surfactant in said additive is cocoylamidopropylbetaine.

9. The composition of claim 1 wherein said additive is present in said composition in an amount in the range of from about 2% to about 3% by volume of the water in said composition.

10. A single universal additive for foaming and stabilizing a cement slurry containing freshwater or salt water comprising an aqueous solution of an alpha-olefinic sulfonate surfactant having the formula
$$H(CH_2)_n\text{—}CH\text{=}CH\text{—}(CH_2)_m SO_3Na$$

wherein n and m are integers in the range from about 6 to about 16 and wherein said alpha-olefinic sulfonate surfactant is present in an amount in the range of from about 15% to about 25% by weight of said aqueous solution, and a betaine surfactant having the formula $$R\text{—}CONHCH_2CH_2CH_2N^+(CH_3)_2CH_2CO_2^-$$

wherein R is a radical selected from the group of decyl, cetyl, oleyl, lauryl and cocoyl and wherein said betaine surfactant is present in an amount in the range of from about 8% to about 12% by weight of said aqueous solution.

11. The additive of claim 10 which further comprises a freezing and pour point depressant selected from the group consisting of ethylene glycol monobutyl ether, diethylene glycol, sodium chloride and mixtures thereof present in an amount in the range of from about 15% to about 25% by weight of said aqueous solution.

12. The additive of claim 10 wherein said alpha-olefinic sulfonate surfactant is a mixture of said alpha-olefinic sulfonates having said formula.

13. The additive of claim 10 wherein said betaine surfactant is cocoylamidopropylbetaine.

14. A method of cementing a subterranean zone penetrated by a well bore comprising the steps of:

(a) forming a foamed cement composition comprised of hydraulic cement, sufficient water to form a pumpable slurry, sufficient gas to form a foam and an effective amount of an additive for foaming and stabilizing said slurry consisting essentially of about 2 parts by weight of an alpha-olefinic sulfonate surfactant having the formula $$H(CH_2)_n\text{—}CH\text{=}CH\text{—}(CH_2)_m SO_3Na$$

wherein n and m are integers in the range of from about 6 to about 16, and about 1 part by weight of a betaine surfactant having the formula $$R\text{—}CONHCH_2CH_2CH_2N^+(CH_3)_2CH_2CO_2^-$$

wherein R is a radical selected from the group of decyl, cetyl, oleyl, lauryl and cocoyl;

(b) pumping said foamed cement composition into said subterranean zone by way of said well bore; and (c) allowing said foamed cement composition to set into a hard impermeable mass.

15. The method of claim 14 wherein said hydraulic cement in said composition is Portland cement.

16. The method of claim 14 wherein said water in said composition is selected from a group of fresh water, unsaturated salt solutions and saturated salt solutions.

17. The method of claim 14 wherein said water in said composition is present in an amount in the range from about 35% to about 65% by weight of hydraulic cement in said composition.

18. The method of claim 14 wherein said water in said composition is a sodium chloride solution and the sodium chloride is present therein in an amount of from about 0.5% up to and including the amount required to saturate said solution.

19. The method of claim 14 wherein said gas in said composition is selected from the group consisting of air and nitrogen.

20. The method of claim 14 wherein said alpha-olefinic sulfonate surfactant in said additive is a mixture of said alpha-olefinic sulfonates having said formula.

21. The method of claim 14 wherein said betaine surfactant in said additive is cocoylamidopropylbetaine.

22. The method of claim 14 wherein said additive is present in said composition in an amount in the range of from about 2% to about 3% by volume of the water in said composition.

* * * * *